No. 607,378. Patented July 12, 1898.
J. N. JOHNSON.
VEHICLE WHEEL.
(Application filed Nov. 30, 1897.)
(No Model.)

Inventor
James N. Johnson.

Witnesses
J. Grant Culverwell,
V. B. Hillyard.

By his Attorneys,
C. A. Snow & Co.

UNITED STATES PATENT OFFICE.

JAMES N. JOHNSON, OF HATTIESBURG, MISSISSIPPI.

VEHICLE-WHEEL.

SPECIFICATION forming part of Letters Patent No. 607,378, dated July 12, 1898.

Application filed November 30, 1897. Serial No. 660,239. (No model.)

*To all whom it may concern:*

Be it known that I, JAMES N. JOHNSON, a citizen of the United States, residing at Hattiesburg, in the county of Perry and State of Mississippi, have invented a new and useful Vehicle-Wheel, of which the following is a specification.

This invention relates to that class of spring-wheels for vehicles which combine all the advantages attained by the use of a pneumatic tire without being liable to puncture and the many objectionable features urged against the use of inflated and like tires.

One of the chief objects of the invention is to secure great flexibility and resiliency of tread without producing a wheel of cumbersome effect and at great expense. Another object is to interpose an elastic or spring girdle between the tread and hub of the wheel which will sustain the vertical pressure as well as lateral stress, said girdle being located as near to the tread as possible without collecting mud or other foreign matter, which would soon choke the individual spring elements and render the latter unserviceable and the wheel unsightly.

For a full understanding of the merits and advantages of the invention reference is to be had to the accompanying drawings and the following description.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 1:
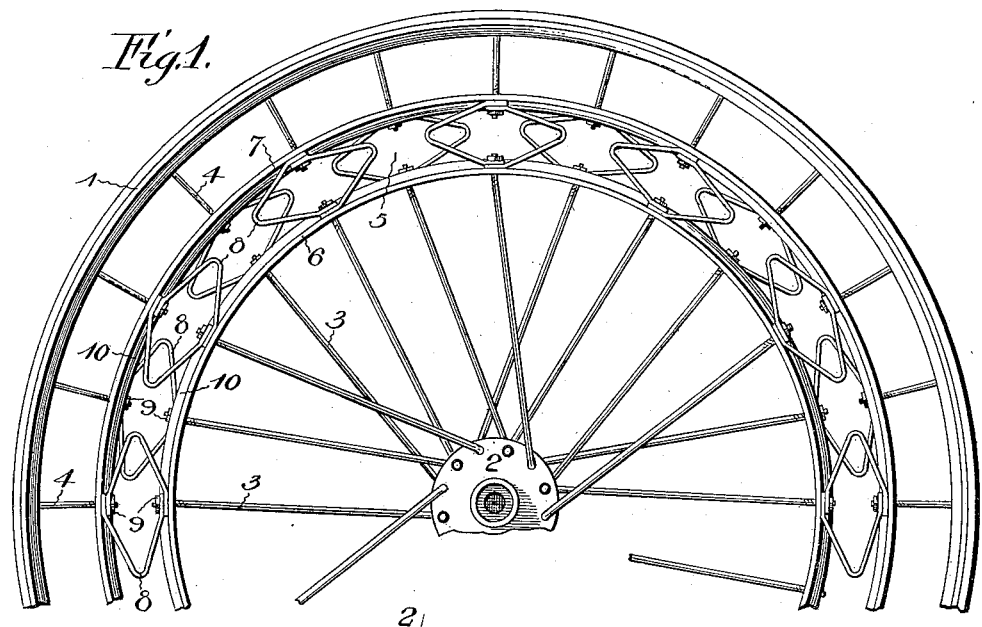
Figure 3:
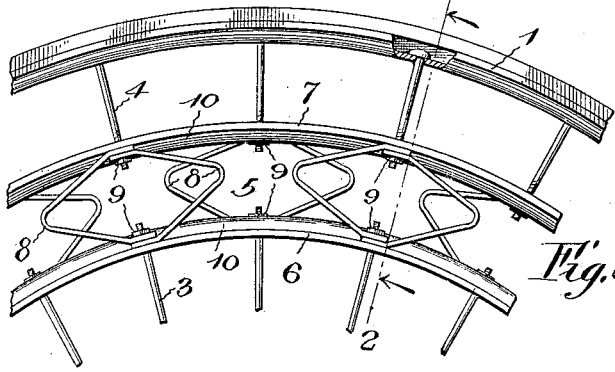
Figure 2:
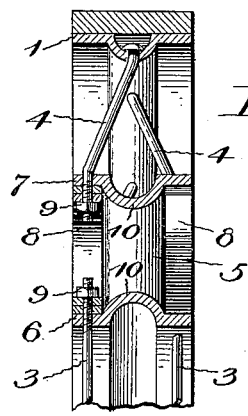
Figure 4:
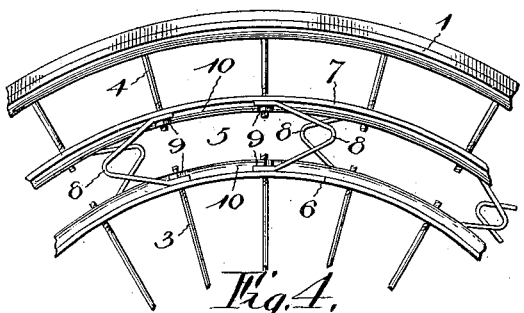
Figure 5:
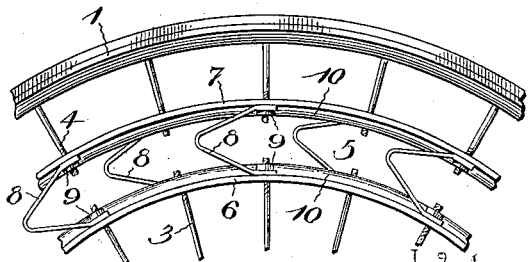

Figure 1 is a side view of the upper portion of a vehicle-wheel constructed in accordance with this invention. Fig. 2 is a transverse section thereof on the line 2 2 of Fig. 3, looking in the direction of the arrows. Fig. 3 is a detail view in elevation of an outer portion of the wheel on a larger scale. Figs. 4 and 5 show different arrangements of the spring elements which with the concentric rings or bands constitute the spring or elastic girdle.

Corresponding and like parts are referred to in the following description and indicated in the several views of the drawings by the same reference characters.

A spring-wheel for vehicles, bicycles, and like machines and conveyances constructed in accordance with this invention comprises a tread or rim 1, a hub 2, inner spokes 3, outer spokes 4, and a spring or elastic girdle 5, located between the hub and tread and connecting the inner or contiguous ends of the inner and outer set of spokes.

The spring-girdle consists of an inner ring or band 6, an outer ring or band 7, concentric with the inner ring, and interposed springs 8, connecting the concentric rings. The inner ring 6 has connection with the outer ends of the spokes 3 and the ring 7 with the inner ends of the spokes 4, the contiguous ends of the spokes being threaded and passing through openings in the respective rings and receiving nuts 9. Within the scope of the invention the springs 8 may be of any form or variety so long as they will serve to maintain the predetermined distance between the rings or bands 6 and 7. As shown, these springs are approximately of V form, this shape being preferred, as it admits of the springs being variously arranged. As illustrated in Fig. 1 and most clearly in Fig. 3, the springs are provided in pairs and placed with their open ends opposite each other, forming, in effect, a multiplicity of elliptical or bow springs. The end portions of the pairs of springs overlap and have openings which are brought into coincident relation and through which pass fastenings by means of which the pairs of springs are connected together and to the respective rings. For the sake of simplicity and economy of construction the end portions of the spokes are made to serve as means for connecting the pairs of springs together and to the respective rings.

As shown in Fig. 4, the springs are arranged singly and with their open ends facing in the same direction, and in Fig. 5 the springs are represented in alternate relation and in pairs, the springs of each pair being separated and with their open ends opposite. In every instance the springs are connected to the respective rings by the spokes, as herein indicated.

In order that the outer portion of the wheel may withstand lateral stress, the springs are provided in two series or sets and placed upon opposite sides of a plane passing centrally through the wheel and parallel with the sides thereof. The outer as well as the inner set of spokes are set staggering, the spokes on one side inclining in an opposite direction to the spokes at the opposite side, whereby the wheel is braced laterally in the ordinary manner. The outer spokes 4 are alternately arranged and incline in opposite directions and the springs are similarly arranged, whereby the springs of one series come opposite the spaces between the springs of the other series. The springs are prevented from turning by having their end portions engage with inwardly-extending ribs 10, which are spun or otherwise provided on the rings 6 and 7.

The tread or rim 1 will be provided with a rubber tire 11, so as to render the wheel noiseless when passing over a stone or other hard pavement. The spring or elastic girdle is located as near the rim or tread as possible, so as to secure a maximum amount of resiliency or flexibility, and is removed therefrom a sufficient distance to prevent the lodgment of mud or foreign matter within the space inclosed by the rings 6 and 7 and about the springs, thereby preventing the choking of the latter and causing the wheel to present an unsightly appearance.

Having thus described the invention, what is claimed as new is—

1. In a vehicle-wheel, the combination of a ring 6 concentric with the hub, a second ring 7 concentric with and surrounding the ring 6, springs placed between the rings 6 and 7 near their outer edges and in alternate relation, and spokes connecting the inner ends of the springs with the ring 6 and the latter with the hub, a rim concentric with the ring 7, and other spokes set staggering and connecting the outer ends of the springs with the ring 7 and the latter with the rim, substantially as described.

2. In a vehicle-wheel, the combination of concentric rings interposed between the hub and rim, approximately V-shaped springs interposed between the concentric rings and disposed in pairs, and having the springs of each pair arranged with their end portions overlapping, and inner and outer spokes connecting the pairs of springs together and to the rings and the latter to the hub and rim of the vehicle-wheel, respectively, substantially as set forth.

3. In a vehicle-wheel, the combination of concentric rings interposed between the hub and rim, and having ribs on their inner or opposing sides, springs arranged upon opposite sides of the ribs with their end portions in engagement with the sides thereof to prevent the springs from turning, and means for connecting the springs to the rings and the latter to the rim and hub of the wheel, substantially as described.

4. The herein-described vehicle-wheel, comprising a hub, a rim, concentric rings between the hub and rim and having ribs on their opposing sides, approximately V-shaped springs arranged in pairs upon opposite sides of the ribs and having their end portions overlapping, and inner and outer spokes connecting the springs in pairs and to the rings and the latter to the hub and rim, respectively, substantially as set forth.

In testimony that I claim the foregoing as my own I have hereto affixed my signature in the presence of two witnesses.

JAMES N. JOHNSON.

Witnesses:
  E. L. McGOWAN,
  J. P. CARTER.